(12) United States Patent
Perrin et al.

(10) Patent No.: US 6,576,166 B1
(45) Date of Patent: Jun. 10, 2003

(54) METHOD OF MANUFACTURING A GRADED-INDEX PLASTICS OPTICAL FIBER

(75) Inventors: Bernard Perrin, Saint-Cheron (FR); Alain Pastouret, Palaiseau (FR); Dominique Morichere, Paris (FR); Xavier Andrieu, Bretigny sur Orge (FR)

(73) Assignee: Nexans, Paris (FR)

( * ) Notice: Subject to any disclaimer, the term of this patent is extended or adjusted under 35 U.S.C. 154(b) by 209 days.

(21) Appl. No.: 09/606,901

(22) Filed: Jun. 30, 2000

(30) Foreign Application Priority Data

Jul. 5, 1999 (FR) ............................................ 99 08617

(51) Int. Cl.⁷ ................................................ B29D 11/00
(52) U.S. Cl. .................. 264/1.29; 425/72.2; 425/174.4; 264/1.36
(58) Field of Search ................................ 264/1.24, 1.28, 264/1.29, 1.36, 1.38; 425/72.2, 174.4

(56) References Cited

FOREIGN PATENT DOCUMENTS

| JP | 1-265207 | * 10/1989 | ................ 264/1.24 |
| WO | WO 96/36478 | 11/1996 | |
| WO | WO 97/20240 | 6/1997 | |

OTHER PUBLICATIONS

Patent Abstracts of Japan, vol. 014, No. 025 ) (P–991) Jan. 18, 1990 corresponding to JP 01 265208A (Mitsubishi Rayon Co Ltd) dated Oct. 23, 1989.

Patent Abstracts of Japan, vol. 014, No. 025 (P–991), Jan. 18, 1990 corresponding to JP 01 265207 A (Mitsubishi Rayon Co Ltd) dated Oct. 23, 1989.

* cited by examiner

*Primary Examiner*—Mathieu D. Vargot
(74) *Attorney, Agent, or Firm*—Sughrue Mion, PLLC

(57) ABSTRACT

A method and apparatus for manufacturing a graded-index plastics optical fiber of continuously varying index profile, starting from a particular polymer P and a particular compound M1, the method including the steps of: preparing two compositions of different refractive index, allowing the compositions to diffuse one into the other, and spinning the compositions so as to obtain the fiber, wherein, prior to extrusion, the two compositions are subjected to active mixing, and extrusion of the fiber is followed by curing.

18 Claims, 4 Drawing Sheets

METHOD OF MANUFACTURING A GRADED-INDEX PLASTICS OPTICAL FIBER

The present invention relates to a method of manufacturing a graded-index plastics optical fiber.

BACKGROUND OF THE INVENTION

Graded-index plastics optical fibers, suitable for use in a spectrum range covering the visible and the near infrared, are advantageous in that they can be applied to broadband access networks. A graded-index plastics optical fiber can comprise at least one polymer and at least one other compound, with the polymer content being substantially the same throughout the fiber, while the concentration of the other compound varies from the core to the periphery of the fiber in such a manner as to form the desired index gradient. Said compound, which can be referred to as a "dopant" or as a "diluant", comprises at least one substance. Manufacturing such plastics optical fibers is difficult in that it is necessary to obtain a distribution of said compound that varies from the core to the periphery of a plastics optical fiber. The fiber needs to have a refractive index profile of the graded-index type that is as smooth as possible, with total variation in refractive index between the center and the periphery of the fiber generally lying in the range 0.01 to 0.03.

There are two main techniques for making said index gradient.

In a first technique, the index gradient is made at least in part before the optical fiber is spun through a die by diffusing compound(s) in at least one given polymer. Said compound can possibly itself comprise another polymer, at least in part.

In a first implementation of that first technique, such diffusion can take place m said given polymer while it is in the molten state. Thus, patent U.S. Pat. No. 5,593,621 describes manufacturing a plastics optical fiber with an index gradient by forming a cylinder of a first molten polymer and then injecting a transparent material into the central portion of said cylinder, said transparent material being diffusible and non-polymerizahle, and possibly mixed with a second molten polymer that is transparent and of refractive index that is different from that of the first polymer. After said nonpolymerizable material has diffused in the first polymer, the cylinder is spun into an optical fibers. In such all implementation, it is possible to install a plurality of nozzles nested in one another so as to improve the diffusion of said material.

In a second implementation of that first technique such diffusion can take place in said diluted polymer. Thus, patent application JP A-9 243 835 describes the manufacture of a graded-index plastics optical fiber comprising a matrix-forming transparent polymer, a nonpolmerizable second compound having a refractive index higher than that of the transparent polymer, and a nonpolymerizable third compound of refractive index smaller than that of the transparent polymer. The second compound is more concentrated in the core of the fiber. The third compound is more concentrated in the periphery of the fiber. Manufacture consists in preparing layers of various compositions of the second and third compounds, together with a monomer constituting a source for the transparent polymer, said compositions being delivered via a multi-orifice nozzle. After diffusion between the layers and spinning, where diffusion can take place before and during spinning, fiber manufacture is finalized by polymerizing said layers so as to transform the monomer into a polymer.

In the second technique for making a graded-index fiber, the index gradient is made almost entirely after the optical fiber has been spun through a die by applying at least one coating layer. The coating layer can comprise at least one polymer in the molten state. Thus, patent application JP-A-9 133 819 describes manufacturing a graded-index plastics optical fiber continuously by applying molten plastics materials of at least two different types and of decreasing refractive indices around the plastics fiber constituting the higher-index core of the fiber.

Alternatively, the coating layer can also include at least one partially polymerizable compound. Thus, patent application JP-A-9 138 313 discloses a method of manufacturing a graded-index plastics optical fiber by applying a solution obtained by diluting a polymer with a low refractive index compound in a monomer around a plastics core of higher index. The polymerized monomer constitutes the first layer of the polymer of refractive index lower than that of the core. Further layers are deposited in the same manner with refractive indices that decrease progressively from the center towards the periphery. Each layer is polymerized by ultraviolet (UV) treatment after it has been applied. In the example, the viscosity of the solutions applied to the core is adjusted to lie in the range 5000 poises to 10,000 poises, i.e. in the range 500 Pa.s to 1000 Pa.s. To implement the invention, the low refractive index compound is not polymerizable.

Patent application JP-A-6 003 533 describes manufacturing a multilayer graded-index plastics optical fiber continuously by preparing substances having different refractive indices and then applying separate layers, allowing diffusion to take place, between the layers, and then curing said layers.

All of the above manufacturing methods rely on compounds diffusing between adjacent layers, which means that said methods are slow and not very reproducible. This gives rise to major problems in manufacturing graded-index plastics optical fibers on an industrial scale.

OBJECTS AND SUMMARY OF THE INVENTION

The method of manufacture of the invention seeks to manufacture graded-index plastics optical fibers in a manner that is as effective as possible, mainly in terms of speed and reproducibility.

The present invention provides a method of manufacturing a graded-index plastics optical fiber whose refractive index varies continuously between its center and its periphery, said fiber being made from at least one polymer P and at least one compound M1 enabling refractive index to be varied, said method comprising:

preparing two compositions of different refractive indices, the refractive index difference between the two compositions being not less than $5 \times 10^{-3}$, each composition comprising at least the polymer P, and a "first" one of said compositions also having at least the compound M1, a cross-linking photo-initiator being present in at least one of said compositions;

the two compositions are diffused into each other; and said mixture is spun so as to obtain a graded-index plastics optical fiber;

wherein:

the polymer P and the compound M1 are selected in such a manner that:

said polymer P is of molecular mass lying in the range 1000 to 20,000 and said compound M1 is of molecular mass lying in the range 100 to 1000;

said compound M1 has at least one reactive functional group selected from the group formed by vinyls and acrylates;

the polymer P has at least one reactive functional group selected from the group formed by vinyls and acrylates; and at least one of the two compounds P and M1 is at least mono-functional, the other of the two compounds P and M1 being at least bi-functional;

wherein prior to spinning, the two compositions are subjected to active mixing using at least one mixing means so as to obtain continuous variation in the refractive index of the optical fiber; and wherein spinning of the graded-index plastics optical fiber is followed by curing giving rise to a cross-linked three-dimensional lattice.

In the invention it is preferred and found more appropriate to use the term "spinning" instead of the term "extrusion", even though these two terms are often capable of being confused, particularly when documents are translated. Extrusion applies in general to materials that are solid, whereas spinning applies in general to materials that are not solid, and often liquid. It is not possible to extrude a liquid.

Such active mixing is mixing that takes place with assistance, i.e. does not rely on diffusion only, and the assistance can be given either statically by forcing two compositions to mix using static diffusion means, generally forced flow means, or else dynamically where mixing is performed actively. Such a method has the advantage of being fast, and in particular much faster than when relying on diffusion on its own between the compositions, and it enables a concentration gradient and thus a refractive index gradient to be obtained that is continuous and practically smooth.

The reaction kinetics of cross-linking are generally such that under maximum insolation and complete transformation of the photo-initiator, the gelling time is less than 10 seconds (s), and preferably less than 2 s.

In the method of the invention, spinning of the graded-index plastics optical fiber is followed by polymerization which constitutes cross-linking. Such cross-linking serves advantageously to lock in place at least part of the components of the plastics optical fiber The resulting plastics optical fiber consequently possesses stability over time and temperature. Under such circumstances, generally at least one of the two compositions includes a monomer; furthermore, at least one of the two compositions includes at least one cross-linking initiator, and preferably each of the two compositions includes at least one cross-linking initiator. A cross-linking initiator, e.g. a photo initiator, is a compound which makes it possible to initiate the desired cross-linking reaction, e.g. in response to temperature or to radiation.

Said cross-linking leads to a cross-linked three-dimensional lattice. Such cross-linking advantageously enables practically all of the components of the plastics optical fiber to be locked into place, thereby providing better physical and temperature stability for the resulting plastics optical fiber and for its index gradient.

In an implementation, the second of said compositions includes at least a compound M2 also enabling refractive index to be varied, the compound M2 having a refractive index that is significantly different from the refractive index of M1, having a molecular mass lying in the range 100 to 1000, and including at least one reactive functional group selected from the group formed by vinyls and acrylates.

Preferably, the compounds M1 and M2 are practically identical in viscosity and the mass proportion of said polymer P relative to the ingredients of the composition is practically constant for each of said compositions. This makes the method easier to implement since the varying proportions of the compound(s) M1 and/or M2, serving mainly to modulate the refractive index, has no significant influence on the viscosity of the compositions.

In an embodiment of the method of the invention, the two compositions are mixed at a temperature such that the viscosity of each of the two compositions lies in the range 1 Pa.s to 25 Pa.s, and preferably in the range 5 Pa.s to 15 Pa.s. This serves advantageously to facilitate implementing the method of the invention since such viscosity enables the compositions to be mixed while they are relatively fluid.

In an implementation of the method of the invention, spinning is performed at a temperature such that the viscosity of each of the two compositions is greater than 50 Pa.s, and preferably greater than 100 Pa.s. In like manner, this serves advantageously to facilitate implementing the method of the invention since such viscosity enables compositions to be spun that are relatively stiff.

The reactive functional groups carried by the ingredients M1 and M2 and by the polymer P are selected from the group formed by vinyls and acrylates, i.e. they are selected from the group formed by acrylates, methacrylates, and vinyl ethers, said groups optionally being halogenated at least in part, usually fluorinated and/or chlorinated.

In an implementation of the method of the invention, every component of a said composition is a material that is at least partially halogenated, usually fluorinated and/or chlorinated.

In a variant of the method of the invention, when the compound M2 is present in the second of said compositions, one of the two compounds M1 or M2 is at least partially fluorinated and the other of the two compounds M2 or M1 is at least partially chlorinated or chloro-fluorinated, and thus of refractive index significantly greater than that of the polymer that is at least partially fluorinated.

The invention also provides apparatus for implementing the above-described manufacturing method. In a first embodiment, the mixing means used is a static type mixer. In such a mixer, mixing takes place mainly with the help of a fixed system which modifies the flows of compositions under pressure. It is the shape of the mixer which induces the shape of the gradient. Natural diffusion between the compositions generally serves to smooth the mixture.

In a first embodiment of the mixer, the mixer comprises at least two plates one above the other, each plate being perforated by a plurality of holes, said holes being disposed out of register with one another from one plate to an adjacent plate. In a second embodiment of the mixer, the mixer comprises at least one cartridge of beads. The beads in the cartridge can be practically identical in diameter. It is also possible for at least some of the beads in the cartridge to be of a diameter that is substantially different from at least some other beads in the cartridge. For example, the bead cartridge can have a bead diameter distribution such that bead diameter becomes smaller and smaller going from one end of the cartridge towards the other. In a third embodiment of the mixer, it comprises a plurality of baffles.

In a second embodiment of the apparatus, the mixing means used is a dynamic type mixer. In such a mixer, mixing takes place mainly by the mixing being externally driven, generally mechanically, in addition to natural diffusion between the compositions and the flow under pressure. In an implementation, the mixer comprises at least one shaft having at least one mixer blade is secured thereabout. Said blade can also include at least one means for dispensing at least one of the two compositions. Such a mixer also includes an appropriate fairing to ensure that the presence of the mixer does not give rise to a zone of turbulence within the compositions.

The plastics optical fiber obtained by the method of the invention has the advantage of being usable in a spectral range extending from the visible to the near infrared, while possessing low attenuation, of a few tens of decibels per kilometer (dB/km), over the entire range.

Another advantage of the optical fiber obtained by the method of the invention is that it can be used at temperatures which are high compared with the temperatures at which plastics optical fibers have been used in the prior art, and it can be used up to at least 125° C., with this being made possible by its cross-linked nature.

The fiber obtained in this way possesses a refractive index profile of the practically smooth graded-index type in which refractive index variation between the center and the periphery of the fiber generally lies in the range 0.01 to 0.03. The diameter of the fiber obtained in this way generally lies in the range 100 μm to 1 mm.

BRIEF DESCRIPTION OF THE DRAWINGS

The invention will be better understood and other characteristics and advantages will appear on reading the following description, given in non-limiting manner and with reference to FIGS. 1 to 7. In these figures, elements that are common are given the same reference numerals throughout.

MORE DETAILED DESCRIPTION

The method of the invention comprises making two compositions, each comprising a polymer P. One of said compositions further comprises at least one compound M1 which is preferably a monomer. The other composition possibly also comprises at least one compound M2 which is preferably a monomer. The concentration of M1 is different in each of the two compositions, thereby giving rise to a different refractive index in each of said compositions. The two values of refractive index obtained in this way constitute the maximum and the minimum of the parabolic refractive index curve desired for the plastics optical fiber obtained by the method. The idea is to cause said index to vary continuously by actively mixing the two initial compositions. For this purpose, the method of the invention is implemented using mixing means which can be constituted by a mixer of static or of dynamic type.

Figure 1:
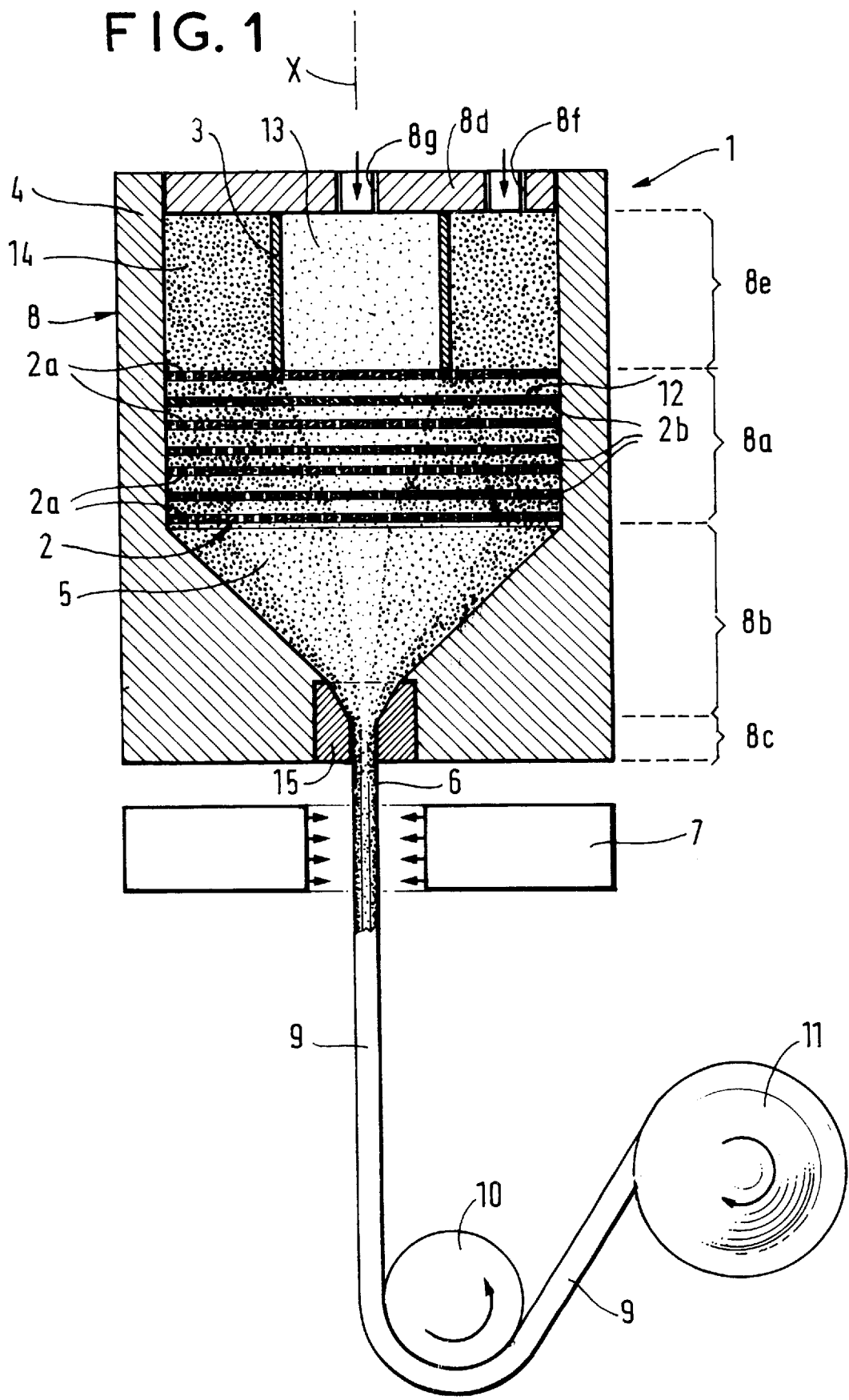
FIG. 1 is a diagrammatic section view of apparatus in which an implementation of the method of the invention is performed, using static mixing means.

FIG. 1 is a highly diagrammatic view of a static mixer 1 in section on a plane containing a central axis X. The mixer 1 has two concentric cylinders 3 and 4 serving as reservoirs for compositions 13 and 14. The cylindrical case 8 of the mixer 1 acts as the reservoir 4 for the composition 14. The higher refractive index composition 13 is placed in the central reservoir 3. By way of example, it comprises merely a polymer P, preferably a fluorinated polymer, plus a compound M1, which compound carries a chlorinated group. The lower refractive index composition 14 is placed in the peripheral reservoir 4. By way of example, it comprises merely the polymer P, which is preferably fluorinated, plus a compound M2, which carries a fluorinated group.

The case 8 has a leakproof top closure 8d with two respective inlets 8g and 8f for controlling the pressure in each of the respective reservoirs 3 and 4, e.g. by means of two positive displacement pumps (not shown). Thus, controlled pressure can be applied to each of the two compositions 13 and 14 so as to obtain identical flow if both compositions 13 and 14 have the same viscosity. However, it is possible to apply different controlled pressures via the openings 8f and 8g, e.g. if different flows are desired for each of the compositions 13 or 14 when the two compositions 13 and 14 are of different viscosities. The case 8 also has a zone 8e in which the two reservoirs 3 and 4 are concentric and isolated from each other, followed by a zone 8a whose top end is the bottom end of the central reservoir 3 and whose bottom end is the bottom of the peripheral reservoir 4. The zone 8a corresponds to a zone in which the two compositions 13 and 14 are mixed together by the mixer 1, i.e. a set 2 of superposed plates (2a, 2b) which are perforated by holes 12. The case 8 also has a conical zone 8b where its section narrows without changing shape, and finally a calibrated zone 8c including a die 15 which gives the desired size to the diameter of the resulting graded-index plastics optical fiber 6. The die 15 is a fitted part, thereby enabling its caliber to be changed easily without needing to change the mixer 1. In a variant, it is possible for the die 15 to form an integral part of the case 8.

Figure 2:
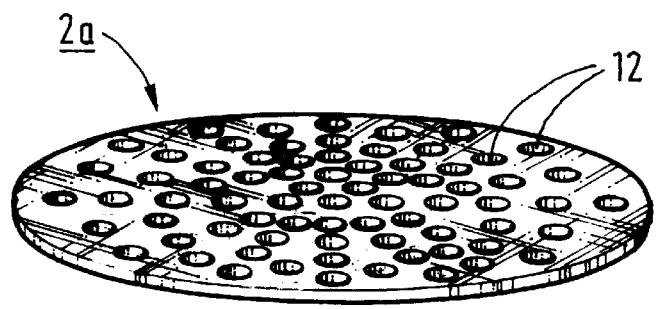
FIG. 2 is a perspective view of a part of the FIG. 1 apparatus.

The static mixer 1 has at least two superposed plates (2a, 2b) in its zone 8a, and in this case it has seven such plates. This set 2 of plates (2a, 2b) is placed at the bottom end of the central reservoir 3 so as to provide radial mixing between the compositions 13 and 14. Mixing 5 that presents a concentration gradient of the compositions 13 and 14 is obtained in the zone 8a. Mixing takes place because of the superposed plates (2a, 2b). Each plate 2a (or 2b), as shown in FIG. 2 in perspective, has holes 12, with said holes 12 generally being located out of register with one another from one plate 2a to an adjacent plate 2b (and similarly from one plate 2b to an adjacent plate 2a). As shown in FIG. 1, there are two types of plate, plates 2a of which there are four, and plates 2b of which there are three, each of the plates 2a or 2b having approximately the same number of holes 12. In a variant that is not shown, the set 2 of plates (2a, 2b) is made up of plates that do not all have approximately the same number of holes 12 as the other plates.

In a variant, the two compositions 13 and 14 can be heated by placing lagging (not shown) around the zone 8a of the case 8 and possibly also around a top portion of the zone 8b of the case 8, so as to obtain desired viscosity for said compositions 13 and 14. The desired viscosity is viscosity that facilitates the mixing of said compositions 13 and 14. Whatever kind of set 2 of plates (2a, 2b) is used, the concentration gradient in the mixing 5 which is related to the resulting refractive index gradient, is related directly to the number of plates (2a, 2b) and to the radial variation in the number and diameter of holes 12 in each of the plates (2a, 2b). In the mixing zone 8a, the viscosity of the compositions 13 and 14 is thus regulated to have a value lying in the range 1 Pa.s to 25 Pa.s so as to favor mixing and smooth the profile of the concentration gradient of the compositions 13 and 14 with the help of additional diffusion of said compositions 13 and 14 in one another.

The resulting mixture 5 is taken to the calibrated die 15 in the zone 8c of the case 8 via the conical zone 8b whose top end is the bottom end of the last plate 2a. This ensures that the shape of the variation in concentration between the compositions 13 and 14 is maintained while section is decreased.

While the mixture flows towards the die 15, it is possible in a variant (not shown) to locate a cryogenic cooling system at least in part around the zones 8b and/or 8c of the case 8. Such a system enables the viscosity of the mixture 5 to be increased progressively up to a value in excess of 50 Pa.s which is compatible with spinning the mixture 5 through the die 15.

At the outlet from the die 15, the resulting graded-index plastics optical fiber 6 is pulled by a capstan 10. In an embodiment, the plastics optical fiber 6 is cured by photo-induced cross-linking using a source 7 of ultraviolet (UV) radiation so as to produce a polymerized plastics optical fiber 9. Then, using the capstan 10, the plastics optical fiber 9 is wound onto a reel 11. The diameter of the fiber 9 is determined by the die 15, but it may be narrowed depending on the pulling force developed by the capstan 10. The finished product produced by the invention can equally well be a plastics optical fiber 6 or a cross-linked plastics optical fiber 9.

Figure 3:
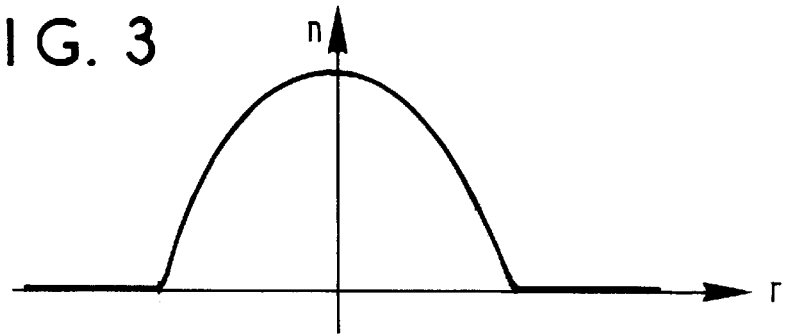
FIG. 3 is a diagram of the index profile obtained in an optical fiber obtained using the apparatus of FIG. 1.

FIG. 3 is a diagrammatic view of the index profile obtained for an optical fiber manufactured by the apparatus of FIG. 1. It can be seen that the profile of the refractive index n of the optical fiber (6) of FIG. 1 is practically smooth so as to form a parabolic gradient as a function of distance r from the center of the fiber (6) which lies on the axis X.

Figure 4:
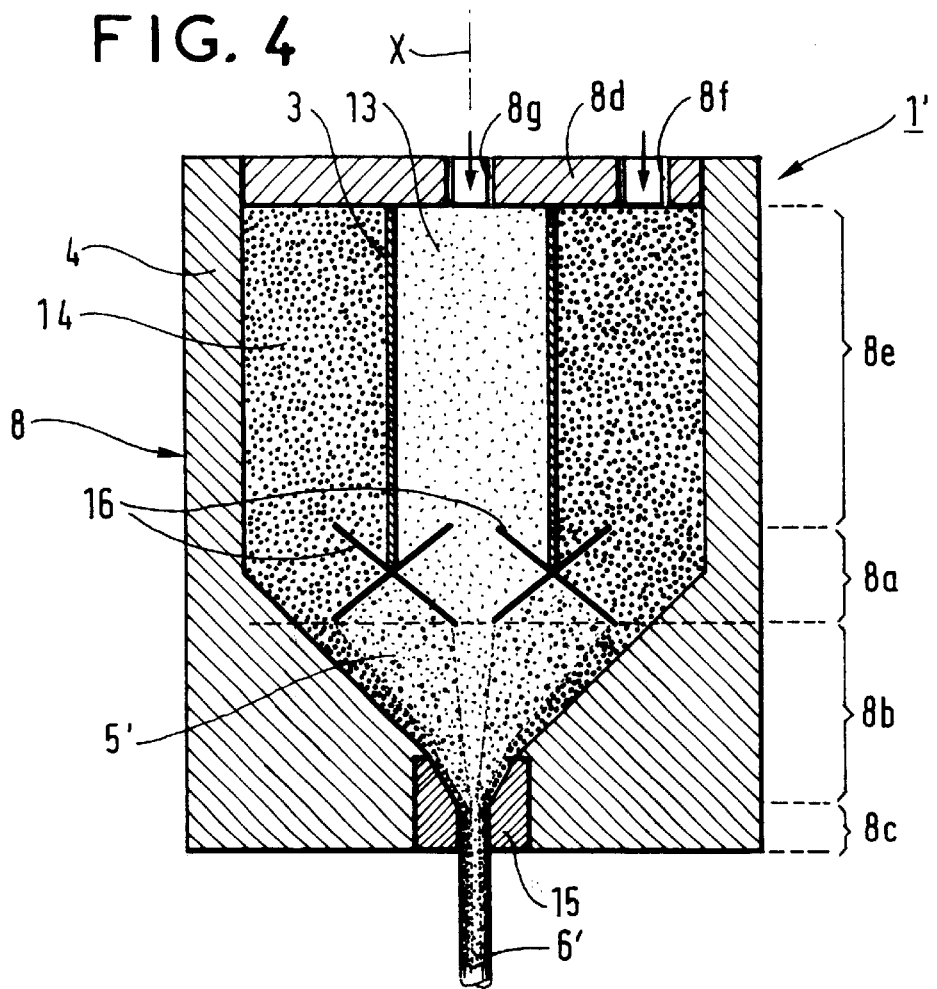
FIG. 4 is a fragmentary diagrammatic section view of another apparatus in which an implementation of the method of the invention is performed, with static mixing means.

In a second embodiment, the static mixer 1' does not comprise a set 2 of plates (2a, 2b) like the mixer 1 of FIG. 1, but instead comprises a set 16 of fixed baffles represented by symbolic cross-shapes in FIG. 4. These baffles are zigzag passages which the compositions 13 and 14 are constrained to follow, thereby achieving progressive mixing 5'. The shape and size of the set 16 of baffles leads directly to the index profile of a graded-index plastics optical fiber 6' as obtained in this way. The profile is of the same type as that shown in FIG. 3.

Figure 5:
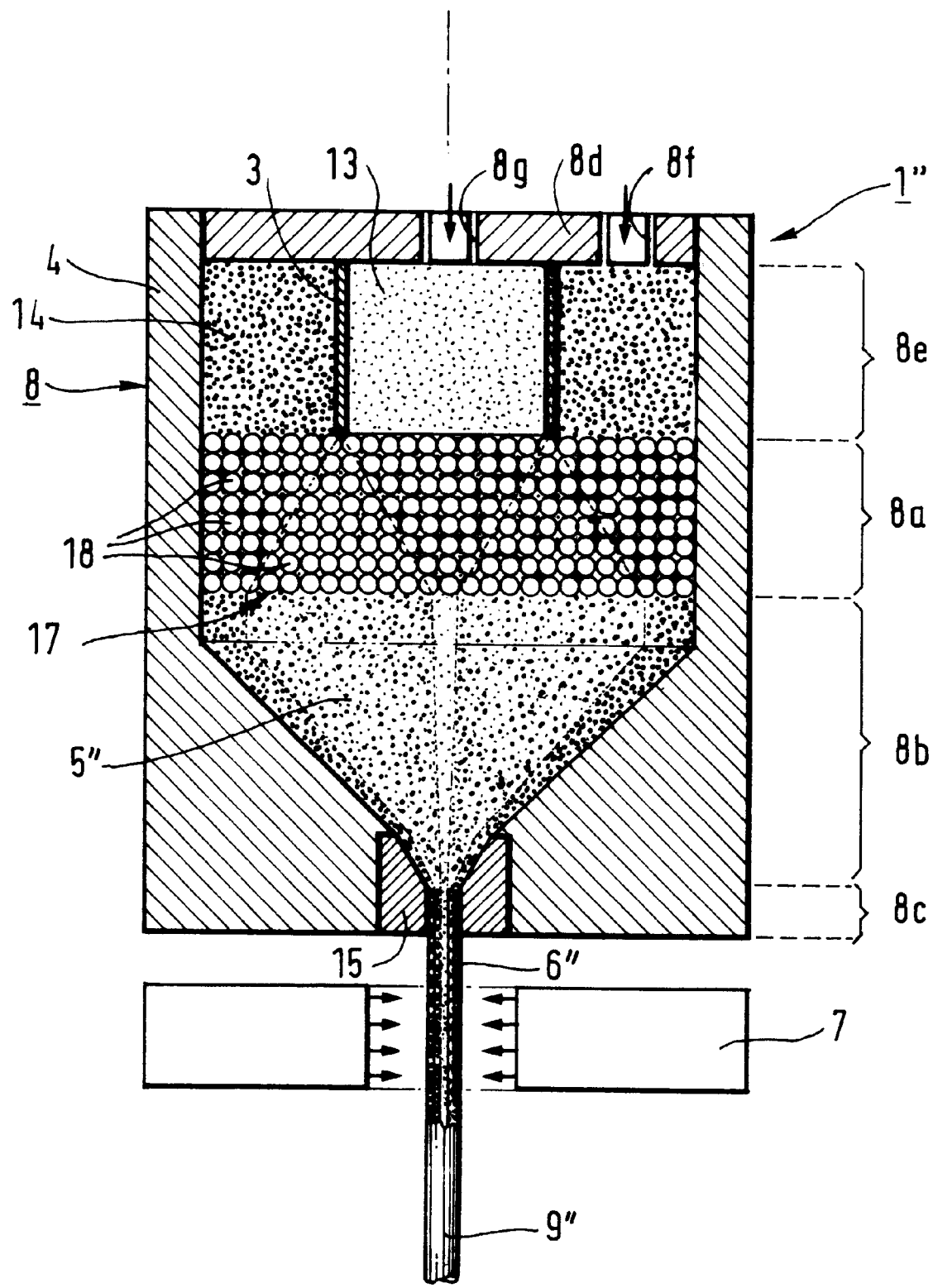
FIG. 5 is a fragmentary diagrammatic section view of another apparatus in which an implementation of the method of the invention is performed, with static mixing means.

In a third embodiment, the static mixer 1" does not have a set 2 of plates (2a, 2b) of the mixer 1 of FIG. 1, but instead has a cartridge 17 of beads 18, as shown in FIG. 5. The resulting mixture is referenced 5". The beads 18 can all be identical in diameter, as shown in FIG. 5, or they can be of different diameters either individually or in groups as compared with adjacent individual beads or groups of beads. Under such circumstances, the gradient of the mixture 5" obtained in this way depends on the diameter and the disposition of the beads 18 within the cartridge 17. A graded-index plastics optical fiber 6" is thus obtained which is photo-cured by the source 7 so as to become a polymerized optical fiber 9". The profiles of the plastics optical fibers 6" and 9" are of the same type as that shown in FIG. 3.

Figure 6:
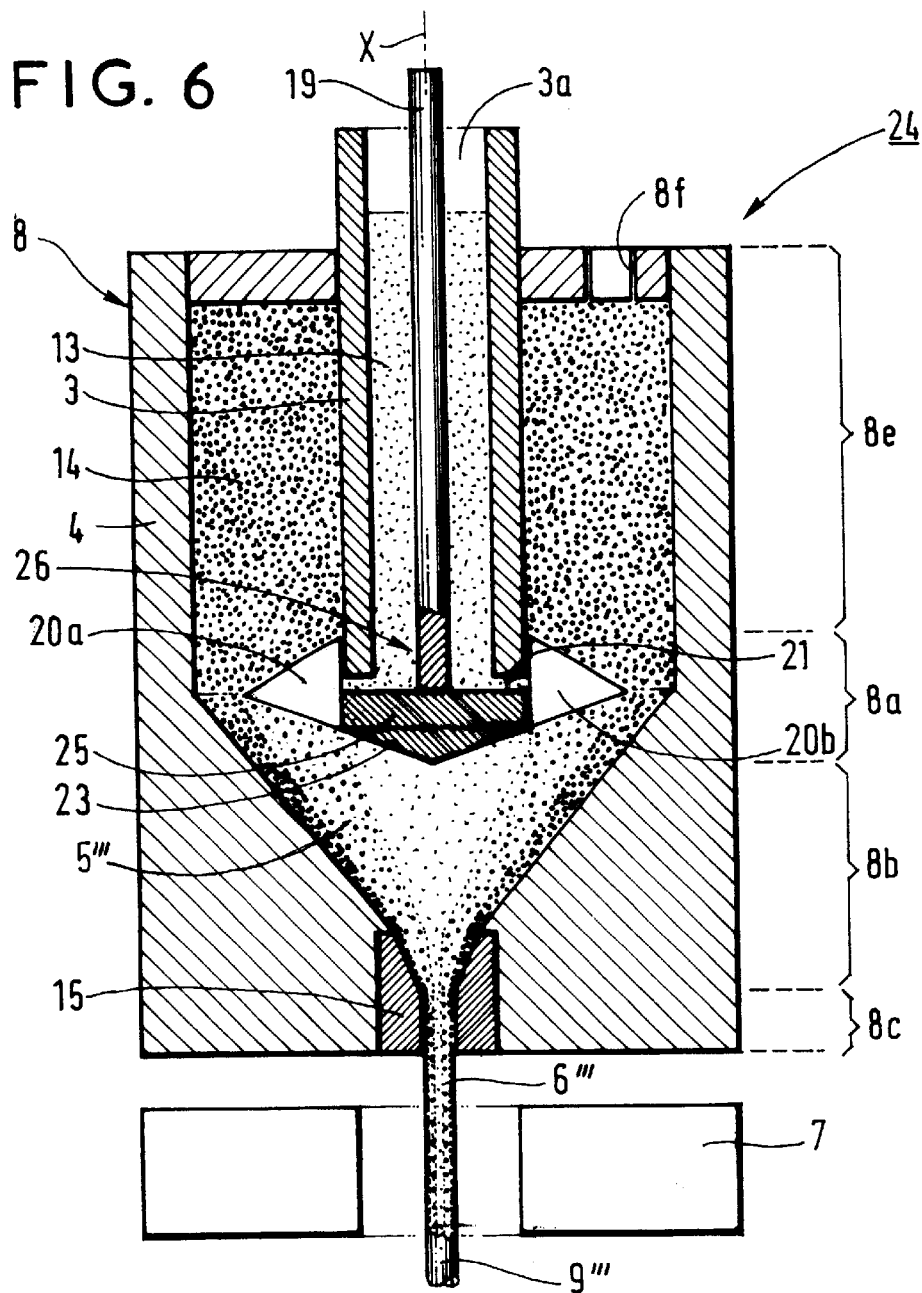
FIG. 6 is a diagrammatic section view of apparatus in which an implementation of the method of the invention is performed with dynamic mixing means.

FIG. 6 is a highly diagrammatic section view on a plane containing a central axis X of a dynamic mixer 24. Mixing 5''' is provided by mixing means 26 comprising a solid shaft 19 on the axis X, which drives two blades 20a and 20b which are secured to the shaft 19 via a part 25 itself fixed to the bottom end of the shaft 19. The blades 20a and 20b are identical in shape and they are disposed symmetrically about the central axis X. Beneath the shaft 19 there is a fairing 23 to avoid creating turbulence in the compositions 13 and 14 and in the mixture 5'''. Elements identical to those of FIG. 1 can be seen, but in this case the opening of the central reservoir 3 is an opening 3a through which the shaft 19 passes, and the bottom of the reservoir 3 is a circular opening 21 allowing the composition 13 to flow towards the blades 20a and 20b. Rotation of the blades 20a and 20b with the shaft 9 serves to perform mixing 5'''. The speed of rotation of the shaft 9, and the number and disposition of the blades 20a and 20b all have a direct influence on the gradient of the mixture 5'''. The resulting graded-index plastics optical fiber 6''' is cured by photo-curing using a UV source 7 so as to provide a polymerized plastics frame 9'''.

Figure 7:
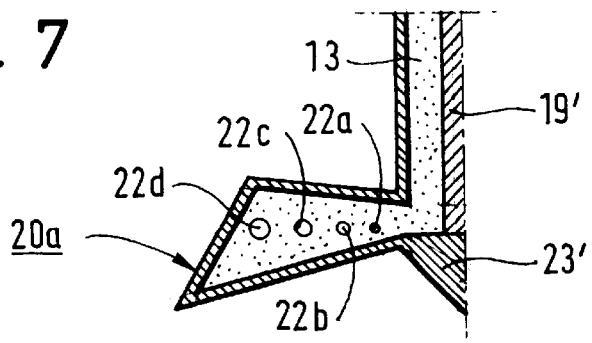
FIG. 7 is a half-view in section of a variant part for the FIG. 6 apparatus.

In a variant of the dynamic mixer 24 of FIG. 5, as shown in half-view in FIG. 7, the flow of the composition 13 no longer takes place via the circular opening 21. In this variant, the blades 20a and 20b are hollow and pierced by holes, e.g. circular holes 22a, 22b, 22c, and 22d, which holes serve as means for dispensing the composition 13 and enable the composition 13 to flow in order to be mixed with the composition 14.

EXAMPLES

The following examples serve to illustrate the invention, but they do not limit the scope thereof.

A. Materials synthesis

Example 1

Manufacturing a Reactive Polymer of the Poly (α fluoro) (meth)acrylate type.

A photoreactive polymer (P1) is made having the following formula:

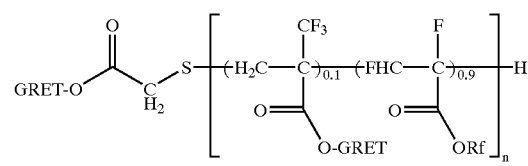

where GRET represents the photo-curable group:

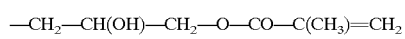

and where Rf represents the $CH(CF_3)_2$ group which serves to adjust refractive index.

This is done initially by synthesizing a precursor polymer, and then by introducing the photoreactive groups on the precursor polymer.

To synthesize the precursor polymer, the following raw materials were used: two monomers, hexafluoroisopropyl α,β-difluoroacrylate and acrylic α-trifluoromethyl acid, the transfer agent being thioglycolic acid and the initiator being 4,4'-azobis (4-cyano) pentanoic acid (ACPA) with quantities of 1 mole of transfer agent per 20 moles of monomer and 0.2 moles of initiator per 20 moles of monomer. Copolymerization was triggered thermally at a temperature of about 60° C. In a variant, it is possible to use another initiator, in which case the temperature which depends on the initiator will generally lie in the range 60° C. to 120° C. In the present example, radical copolymerization was performed in bulk. In a variant it could equally well be performed in the presence of a solvent.

Finally, a precursor polymer was obtained comprising 20 monomer units. The polymer (P1) was obtained by causing 3 moles of glycidyl methacrylate to react with 1 mole of said polymer in the presence of a chromium-based catalyst diisopropyl salicylate (DIPS) chromium. The resulting polymer (P1) has three reactive groups of the methacrylate type.

Example 2

Making Mixtures from the Reactive Polymer P1 of the poly(α-fluoro) (meth)acrylate type polymer of Example 1.

Two different mixtures were made, each comprising a commercial photo-initiator IRGACURE 651, the reactive polymer (P1) having the formula of Example 1, and a reactive diluant made up of two monomers in different concentrations depending on the mixture, the two monomers being (M1) hexafluoroisopropyl α-fluoroacrylate whose homopolymer at 20° C. has a refractive index of 1.3502, and (M2) trichloroethyl α,β-difluoroacrylate whose homopolymer at 20° C. has a refractive index equal to 1.5063. In a variant, it is possible to use any other photo-initiator of the IRGACURE family. Table 1 below summarizes the various compositions and properties of the mixtures, the quantities being based on a mixture weighing 700 grams:

TABLE 1

| Mixture No. | Quantity of M1 (in grams) | Quantity of M2 (in grams) | Quantity of reactive polymer (in grams) | Viscosity of mixture (in Pa.s at 20° C.) | Refractive index of mixture at 20° C. |
|---|---|---|---|---|---|
| 1 | 35 | 315 | 350 | 8.2 | 1.4271 |
| 2 | 140 | 210 | 350 | 6.9 | 1.4037 |

It can thus be seen that the ratio in weight % of polymer over the total ingredients in the mixture is constant, whereas within the reactive diluant the relative proportion in weight % of M1 over the sum of M1 plus M2 varies from one mixture to the other. This serves advantageously to control the viscosities of the two mixtures while varying the refractive indices of these mixtures.

Example 3

Making Chlorinated Polyether Type Reactive polymers (P2)

As precursor polymers for the reactive polymers, various polymers of the fluorinated polyether, diol, etc. types are available having a number of monomer units equal to $\underline{m}$, where in the invention, $\underline{m}$ lies in the range 10 to 1000, preferably in the range 20 to 100, and for which the general structure of the backbone is as follows:

—(—OCF$_2$—CF$_2$—)$_x$—(—OCF$_2$—)$_y$—, with x+y=m, this is a commercial product, FOBMLIN Z sold by Ausimont;

—(—OCF$_2$—CF(CF$_3$)—)$_m$—, this is a commercial product, KRYTOX sold by Du Pont de Nemours;

—(—OCF$_2$—CF$_2$—CF$_2$—)$_m$—, this is a commercial product, DEMNUM sold by Daikin; and —(—OCF$_2$—CF$_2$—CH$_2$—)$_m$—, this is a commercial product, DEMNUM H, sold by Daikin.

Various polymers (P2) were thus obtained by reacting 2 moles of methacryloyl chloride with 1 mole of one of the above precursor polymers. In a variant, much the same result can be obtained by performing a trans-esterification reaction of methyl methacrylate in the presence of a catalyst such as zirconium acetylacetonate. The polymers (P2) obtained in this way have two acrylate type reactive groups.

Example 4

Making Non-Fluorinated Reactive Polymers (P3)

A photo-reactive polymer (P3) was made having the following formula:

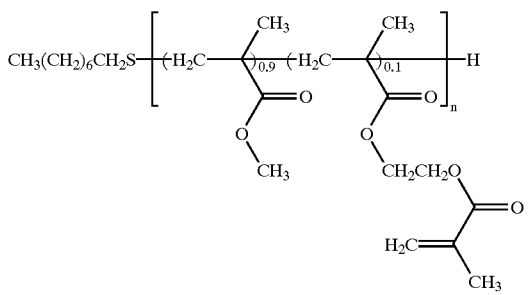

For this purpose, the procedure began by synthesizing a precursor copolymer onto which methacrylate groups were subsequently introduced.

The precursor polymer was synthesized from the following raw materials: two monomers, methyl methacrylate (MMA) and hydroxyethyl methacrylate (HEMA) in respective molar concentrations of 90/10, with the transfer agent being thiol octane at 3.3% mol/mol of total quantity of monomer, and with the thermal initiator being azoisobutyronitril (AIBN) at 1% mol/mol. The reaction was performed in tetrahydrofuran (THF) as the solvent at a temperature of 65° C.

The resulting polymer had a molecular mass of about 6500 and a mean degree of polymerization of about 60, which represents six hydroxyl functions potentially substituted by acrylate functions per polymer backbone.

Polymer P3 was then obtained by causing the above polymer to react in dichloromethane (CH$_2$Cl$_2$) at a temperature of 30° C., with two equivalents of methacrylic anhydride relative to the total quantity of functions potentially substituted by acrylate functions. The reaction is catalyzed with 4-dimethylamino pyridine (DMAP).

Thereafter, a monomer is made in the same manner for causing the refractive index of the resins to vary, namely trichloroethyl methacrylate (n$_D$=1.4878) by causing trichloroethanol to react with methacrylic anhydride in the presence of DMAP.

Two mixtures or photoreactive resins are then made having different refractive indices and each containing 1% of IRGACURE 184 (hydroxycyclohexylphenylcetone) as photo-initiator.

The first mixture has a viscosity of 5 Pa.s at 20° C. and contains 50% by weight of polymer P1 and 50% of a reactive diluant constituted by 20% by weight of trichloroethyl methacrylate and 80% by weight of MMA, with its refractive index being equal to 1.46.

The second mixture had a viscosity of 5 Pa.s at 20° C. and comprised 52% of polymer P1 and 48% of a reactive diluant constituted by 80% by weight of trichloroethyl methacrylate and 20% by weight of MMA, its refractive index being equal to 1.482.

B. Manufacturing Plastics Optical Fiber

Example 5

Manufacturing a Graded-Index Polymerized plastics optical fiber 9 from the amorphous resins of Example 2 based on the photoreactive polymer P1 of the poly-$\alpha,(\beta)$-fluoro(meth)acrylate type.

The method of manufacturing said graded-index polymerized plastics optical fiber 9 of the invention is shown in FIG. 1, as described above, and the two resins used had refractive indices of 1.427 and 1.403 ($\Delta n=0.024$) with viscosities that were substantially equivalent and respectively equal to 8.2 Pa.s and 6.9 Pa.s at 20° C. The diameter of the base 8 was about 10 cm. The zone 8a was heated to a temperature of about 30° C., while the zones 8b and 8c were cooled to a temperature of about 0° C., the total height of the lagged zones 8a, 8b, and 8c being about 30 cm. The diameter of the plates 2a and 2b was about 10 cm, and each of the holes 12 had a diameter of about 1 mm. The applied pressure was about $10^5$ Pa.

The refractive index profile of the polymerized fiber 9 obtained in this way was of the type shown in FIG. 3, giving an index gradient of substantially parabolic type, uniform over the length of the fiber 9, and practically smooth and set within the polymer lattice. Refractive index variant between the center and the periphery of the fiber was about 0.024. The diameter of the fiber 9 was about 300 $\mu$m. The graded-index polymerized plastics optical fiber 9 is found to have good high temperature performance.

Example 6

Manufacturing a Graded-Index Polymerized plastics optical fiber 9 with the static mixer apparatus and using resins made with fluorinated polyether type reactive polymers P2 of Example 3.

A polymerized plastics optical fiber 9 was made in the same manner as in Example 5.

Example 7

Manufacturing a Graded-Index Polymerized plastics optical fiber 9 with the static mixer apparatus using resins made with fluorinated polyether type reactive polymers P3 of Example 4.

A graded-index plastics optical fiber 9 was made using those two resins at equal viscosities and with different refractive indices ($\Delta n=0.022$) using the embodiment used in Example 5.

The refractive index profile of the resulting polymerized fiber 9 was of the substantially parabolic graded index type and was uniform over the length of the fiber 9, being practically smooth and set in the polymer lattice. Refractive index variation between the core and the periphery was about 0.022, the fiber 9 had a diameter of about 300 $\mu$m, and it demonstrated good high temperature performance.

Naturally, the plastics optical fiber of the invention is not limited to the examples shown and described above. For example, in a variant, provision could be made for depositing at least one layer of coating on a previously obtained polymerized plastics optical fiber so as to protect it from the external environment and so as to increase its mechanical strength.

What is claimed is:

1. A method of manufacturing a graded-index plastics optical fiber whose refractive index varies continuously between its center and its periphery, said fiber being made from at least one polymer P and at least one compound M1 enabling refractive index to be varied, said method comprising:

preparing two compositions of different refractive indices, the refractive index difference between the two compositions being not less than $5 \times 10^{-3}$, each composition comprising at least the polymer P, and a "first" one of said compositions also having at least the compound M1, a cross-linking photo-initiator being present in at least one of said compositions;

diffusing the two compositions into each other; and spinning said mixture so as to obtain a graded-index plastics optical fiber;

wherein the polymer P and the compound M1 are selected in such a manner that:

said polymer P is of molecular mass lying in the range 1000 to 20,000 and said compound M1 is of molecular mass lying in the range 100 to 1000;

said compound M1 has at least on reactive functional group selected from the group consisting of vinyls and acrylates;

the polymer P has at least one reactive functional group selected from the group consisting of vinyls and acrylates; and at least one of the two compounds P and M1 is at least mono-functional, the other of the two compounds P and M1 being at least bi-functional;

wherein, prior to spinning, the two compositions are subjected to active mixing using at least one mixing means so as to obtain continuous variation in the refractive index of the optical fiber; and wherein spinning of the graded-index plastics optical fiber is followed by curing giving rinse to a cross-linked three-dimensional lattice.

2. A method according to claim 1, in which the cross-linking kinetics is such that under maximum insolation and complete transformation of the photo-initiator, the gelling time is less than 10 s.

3. A method according to claim 2, in which the gelling time is less than 2 s.

4. A method according to claim 1, in which the second of said compositions includes at least a compound M2 also enabling the refractive index to be varied, the compound M2 having a refractive index that is significantly different from the refractive index of M1, having a molecular mass lying in the range 100 to 1000, and including at least one reactive functional group selected from the group consisting of vinyls and acrylates.

5. A method according to claim 4, in which the compounds M1 and M2 are practically identical in viscosity and in which the mass proportion of said polymer P relative to the ingredients of the composition is substantially constant for each of said compositions.

6. A method according to claim 1, in which the two compositions are mixed at a temperature such that the viscosity of each of the two compositions lies in the range 1 Pa.s to 25 Pa.s.

7. A method according to claim 1, in which spinning is performed at a temperature such that the viscosity of each of the two compositions is greater than 50 Pa.s.

8. A method according to claim 1, in which each component of a said composition is a material that is at least partially halogenated.

9. A method according to claim 8, in which, when compound M2 is present in the second of said compositions, one of the compounds M1 and M2 is at least partially fluorinated and the other of the compounds M2 and M1 is at least partially chlorinated or chloro-fluorinated.

10. An apparatus for implementing the method according to claim 1, said apparatus including a mixing means for subjecting the two compositions to active mixing, a spinning device for spinning said mixture so as to obtain a graded-index plastics optical fiber, and a curing device which cures the graded-index plastics optical fiber to give rise to a cross-linked three-dimensional lattice, wherein the mixing means is a static mixer and subjects said two compositions to active mixing in such a way as to obtain continuous variation in the refractive index of the optical fiber.

11. An apparatus according to claim 10, in which the mixer comprises at least two plates one above the other, each plate being perforated by a plurality of holes, said holes being disposed out of register with one another from one plate to an adjacent plate.

12. An apparatus according to claim 10, in which the mixer comprises at least one cartridge of beads.

13. An apparatus according to claim 12, in which the beads of the cartridge are substantially identical in diameter to one another.

14. An apparatus according to claim 12, in which at least some of the beads of the cartridge are of a diameter that is significantly different from at least some of the other beads of the cartridge.

15. An apparatus according to claim 10, in which the mixer comprises a plurality of baffles.

16. An apparatus for implementing the method according to claim 1, wherein the mixing means used is a dynamic mixer.

17. An apparatus according to claim 16, in which the mixer comprises at least one shaft having at least one mixer blade fixed thereabout.

18. An apparatus according to claim 17, in which said blade further includes at least one dispenser means for dispensing at least one of the two compositions.

\* \* \* \* \*